United States Patent [19]
Hayward et al.

[11] 3,802,252
[45] Apr. 9, 1974

[54] PRESSURE AND VACUUM MONITORING APPARATUS

[75] Inventors: Gary G. Hayward; Samuel O. Raymond, both of West Falmouth, Mass.

[73] Assignee: Benthos, Inc., North Falmouth, Mass.

[22] Filed: June 9, 1972

[21] Appl. No.: 261,528

[52] U.S. Cl.................... 73/52, 73/45.4, 209/111.9
[51] Int. Cl. .......................................... G01m 3/00
[58] Field of Search ........... 73/52, 45.4, 69; 209/72, 209/111.8, 111.9

[56] References Cited
UNITED STATES PATENTS

| | | | |
|---|---|---|---|
| 3,441,132 | 4/1969 | Browning | 73/52 X |
| 1,956,301 | 4/1934 | Richardson | 73/52 |
| 2,320,390 | 6/1943 | Shmurak | 73/52 |
| 3,290,922 | 12/1966 | Thompson | 73/52 |
| 3,416,360 | 12/1968 | Ochs | 73/52 |

FOREIGN PATENTS OR APPLICATIONS

| | | | |
|---|---|---|---|
| 1,037,533 | 7/1966 | Great Britain | 73/52 |

Primary Examiner—Richard C. Queisser
Assistant Examiner—Joseph W. Roskos
Attorney, Agent, or Firm—Schiller & Pandiscio

[57] ABSTRACT

The invention is an apparatus and method for monitoring the pressure or vacuum in a sealed container. The invention consists of striking a can with a magnetic pulse of force to cause the can to vibrate freely and thereby generate an acoustic ping which is sensed by an electrical pickup device. The frequency of the acoustic ping is a function of the internal pressure in the container. Accordingly, the frequency spectrum of the signal output of the pickup device is examined in a discriminator circuit to determine if the signal output contains selected frequencies at an energy level indicative of a desired pressure level. If not, the container is rejected. The signal output of the pickup device is gated so that the discriminator circuit is rendered insensitive both to ambient noise and to the large noise pulse generated while the can is being subjected to the magnetic pulse of force and also so that only the purest part of the signal output generated in response to the acoustic ping is examined by the discriminator circuit.

32 Claims, 11 Drawing Figures

PRESSURE AND VACUUM MONITORING APPARATUS

This invention relates to a non-destructive method and apparatus for monitoring the pressure in sealed containers, and more particularly for inspection of (a) vacuum packed jars or cans containing perishable foods or other materials, (b) containers of carbonated beverages, and (c) aerosol cans of shaving creams, polishes and the like. For various reasons it is desireable in the case of vacuum packed food products to determine whether the container has the desired vacuum, since insufficient vacuum or a positive internal pressure may be indicative of something other than a leaky can or insufficient evacuation. Thus the existence of a positive pressure in a container packed under vacuum is often indicative of food spoilage. It also is desireable to determine if aerosol cans have a sufficiently positive internal pressure and whether or not the contents of carbonated beverage cans are flat.

Heretofore, a variety of methods and apparatus have been devised for determining the internal pressure in sealed containers having at least one flexible wall portion, e.g metal cans and jars or bottles having metal covers or caps. The prior art in this field is exemplified by U.S. Pat. Nos. 3,513,689, 3,416,360, 3,290,922, 3,137,160, 2,648,977, 2,608,089, 1,956,301, 1,869,067 and other references cited in such patents. These prior methods and equipment have not been fully satisfactory and as a result in many packing and bottling plants, inspection is performed by destructive testing methods or visually, e.g., inspecting vacuum-packed cans for bulging ends.

Accordingly, the primary object of this invention is to provide a new method and new equipment for non-destructive testing of the internal pressure in sealed containers. The invention is applicable for testing sealed containers either under vacuum (less than atmospheric pressure) or positive (more than atmospheric) pressure. Accordingly, unless otherwise indicated or rendered obvious by the context in which it is used, the term "pressure" is used throughout the following specification and claims to denote either positive or negative pressure within a container relative to the pressure outside of the container.

A more specific object is to improve upon the prior art technique, exemplified by the invention disclosed in U.S. Pat. No. 3,290,922, of providing a source of continuous vibration to cause the metal top on a vacuum packed jar to vibrate and determining, by monitoring the frequency of the signals picked up by a microphone positioned next to the vibrating top, whether the vacuum within the jar is within tolerable limits. This prior art method requires the use of an oscillator that operates continuously and is coupled to drive a transducer coil which in turn causes the metal top to flex and vibrate. A requirement of such method is that the oscillator be set to drive the transducer coil at one half of the resonant frequency of the metal top in order to achieve optimum output. Alternatively, this prior art technique may employ a frequency modulated oscillator so that the transducer coil will provide a flexing force at a frequency determined by the modulation frequency of the oscillator. This prior art technique requires means to continuously readjust the driving frequency to determine the point of resonance and requires appreciable time to perform the frequency sweep. Hence it is not well suited to testing cans being transported on a high speed conveyor. Also with either variation of the aforesaid technique, the microphone picks up the oscillator signal which, particularly if it includes higher harmonics, has a detrimental effect on the system's capability to detect "bad" containers. This prior art technique also is affected adversely by noise generated by the coil and its magnetic field and spurious signals from other modes of vibration in the container or from the structure surrounding the containers. Furthermore, frequency drift may be a serious problem when the oscillator is set to operate at a selected frequency. These and other limitations are overcome by the present invention.

Still other objects of the invention are disclosed in or rendered obvious by the following description of the invention.

Briefly summarized, the invention comprises a transducer coil, means for producing and discharging an electrical pulse in said coil so that the coil produces a pulse of force that will deflect an adjacent end (or other portion) of a can to be inspected, with the result that the can end will vibrate and produce an acoustical wave in the can at a frequency that is a function of the internal pressure in the can. A pickup unit is mounted adjacent to an end or other portion of the can for generating an oscillating electrical signal in response to the acoustical energy generated by the vibration of the can. Signal responsive circuit means connected to the pickup means permit monitoring the frequency of the oscillating electrical signal. However, the circuit means is gated so that it is prevented from responding to that portion of the pickup's electrical output that is generated during the time that the coil is energized and the can end is subjected to the pulse of force produced by the coil. This gating step rejects noise generated by the coil per se and by its magnetic field, and also the acoustic pulse put out by the can when it is being driven by the magnetic field. The gating also is set so that only a selected and limited portion of the acoustic signal generated by the vibrating can is monitored, thus eliminating spurious echoes, reflections, and reverberations from other modes of vibration in the can or from structure supporting or adjacent to the can. The signal responsive circuit is adapted to frequency discriminate the electrical signal output of the pickup means and to provide an output according to whether or not a predetermined frequency or frequency band (characteristic of the resonant frequency of the end of a can with correct pressure) is present and exceeds a selected threshold level. One embodiment also is adapted to grade containers according to variations in the energy intensity of selected frequency bands in the pickup's output signal. Provision also is made for ejecting "bad" cans and for compensating for the effect of temperature on the vibrating frequency of the can under test.

These and other features of the invention are described below with reference to the drawings in which.

Like numbers are used in the various figures to designate like components.

Figure 1:
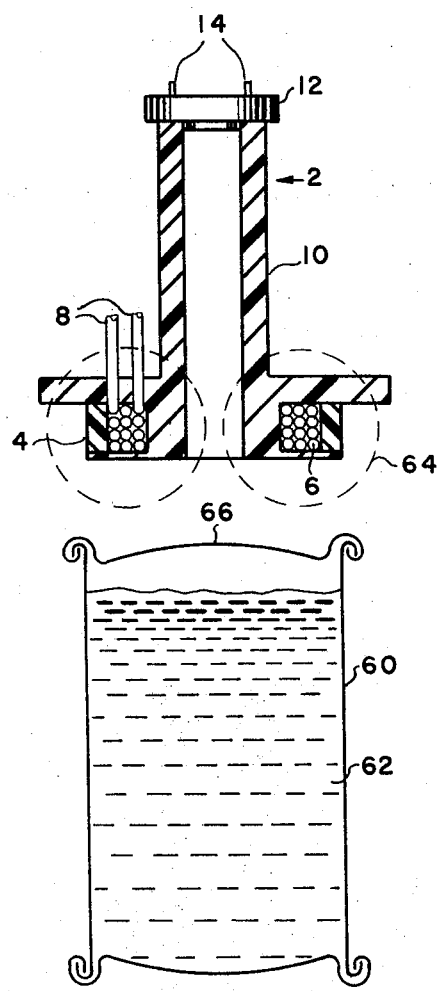
FIG. 1 is an elevational view showing a transducer assembly comprising a coil and microphone in proximity to one end of a can containing a fluid under pressure.

Referring now to FIG. 1, the invention comprises a transducer pickup 2 unit that consists of a housing 4 in which is mounted a transducer coil 6 whose ends 8 are brought out of the housing for connection to a drive circuit as hereinafter described. The housing 4 has a tubular extension 10 with a microphone or pickup 12 mounted at its upper end. The microphone has terminal leads 14 that connect it to circuit means hereinafter described.

Figure 2:
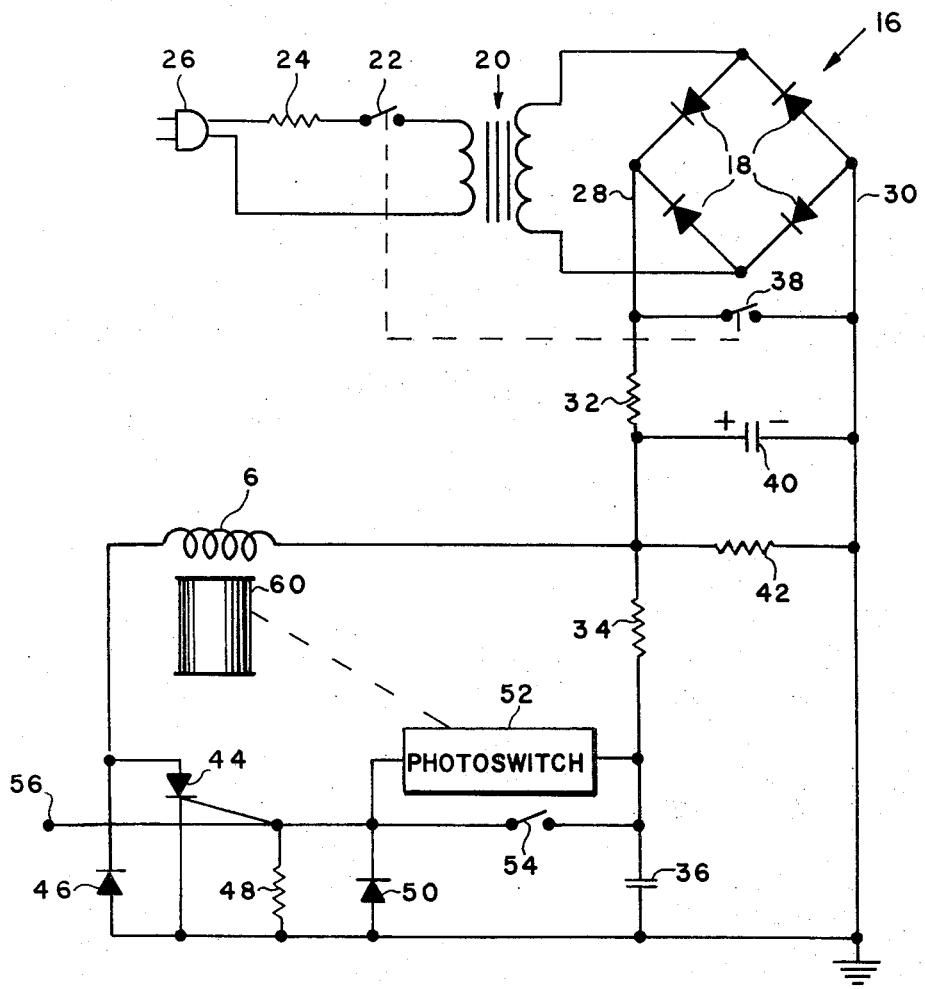
FIG. 2 illustrates the transducer coil and a preferred form of pulsing circuit for the coil.

FIG. 2 illustrates a preferred form of drive circuit for pulsing the transducer coil. The drive circuit includes a full wave rectifier 16 in the form of four diodes 18 connected in a conventional bridge arrangement. Two opposed sides of the bridge are connected to the ends of a secondary coil of a transformer 20 whose primary coil is connected via a normally open switch 22 and a charging resistor 24 to a terminal plug 26 which is coupled to a source of 60 cycle A.C. power (not shown). The other two opposed sides of the bridge are connected to conductive leads 28 and 30 that are connected to each other via a pair of resistors 32 and 34 and a capacitor 36. The junction of capacitor 36 and lead 30 is connected to ground. A second normally closed switch 38 is connected directly across leads 28 and 30. Switch 38 is ganged to switch 22. An energy storing capacitor 40 is connected at one end to lead 30 and at the other end to the junction of resistors 32 and 34. A bleeder resistor 42 is connected in parallel with capacitor 40. One end of transducer coil 6 is connected to the junction of resistors 32 and 34 while its other end is connected to ground via an SCR 44 as shown. A diode 46 is connected across the SCR as shown. The gate electrode of the SCR is connected to ground via a resistor 48. Another diode 50 is connected in parallel with resistor 48. Connected between the same gate electrode and the junction of resistor 34 and capacitor 36 is a photoswitch 52. As an optional measure, a mechanical switch 54 may be connected in parallel with the photoswitch circuit 52. The gate electrode also is connected to an output terminal 56.

Figure 3:
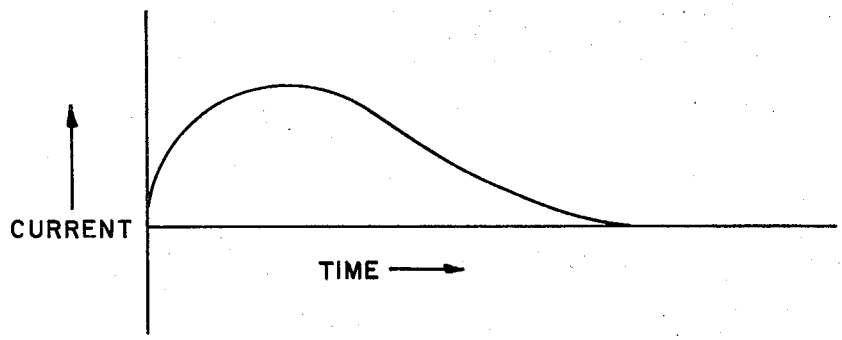
FIG. 3 illustrates a typical current pulse applied to the coil.

The drive the transducer coil, switch 22 is closed to energize the rectifier 16. The latter causes the capacitor 40 to be charged through resistor 32 which limits the current flow. Assuming that capacitor 40 is charged to a suitable level, e.g., 80 percent of the voltage output of the rectifier, firing of the SCR will cause current to flow from capacitor 40 through coil 6. FIG. 3 shows a typical wave form of the current in the coil during discharge of capacitor 40. The greater the capacity of capacitor 40 and the inductance of the coil, the longer will be the length of the current pulse. The higher the resistance of the circuit through the coil, the more slowly the current will decrease. In practice, the parameters of the circuit (capacitance, inductance, and resistance) are set so that the current is damped on its return to zero, so that effectively the coil is subjected to a single current pulse. The SCR is fired by closing switch 54 or by operation of the photoswitch 52. The latter may be of any suitable design, e.g., it may be a phototransistor circuit; whatever its form, its essential requirement is that it operate to fire the SCR whenever it fails to detect an incident light beam as described below in connections with FIGS. 6 and 7. Switch 54 may be operated manually or by direct or indirect engagement with a container to be inspected. Diodes 46 and 50 protect the SCR. Capacitor 36 establishes firing control over the SCR. Re-closing of switch 38 (when switch 22 is reopened) allows capacitor 40 to discharge.

Figure 4:
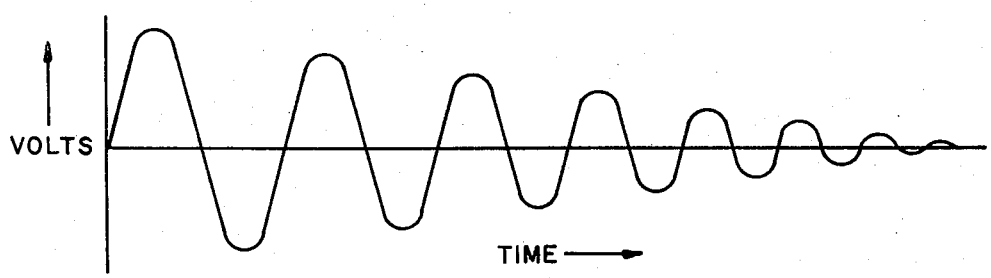
FIG. 4 illustrates a typical tone, i.e., acoustic wave, produced by the vibrating end of a can.

Referring now to FIGS. 1 and 4, assume that an aluminum can 60 with positive internal fluid pressure, e.g., a can of beer or other carbonated beverage 62, is located adjacent to the transducer coil as shown. When current is flowing in the coil, a magnetic field 64 is generated. This field expands and collapses as the current in the coil rises and falls. As the field expands, eddy currents are generated in the adjacent can end 66 in one direction. As the magnetic field collapses, eddy currents are generated in the can end in the opposite direction. The eddy currents produced by the increasing field produce a force on the can end away from the coil 6. Eddy currents also are produced as the field collapses and these currents also produce a force on the can end away from the coil. This driving force on the can end is of a short duration and hence is appropriately described as a pulse of force.

Application of this pulse of force to the can end will cause the latter to vibrate mechanically at its natural frequency. The natural frequency of the can end is a function of the pressure difference across the end, the thickness and diameter of the end, and the density of the material of which the end is made. Thus for a fixed can design, the frequency of vibration of the can end can be used as a determination of the gas pressure within the can (the natural frequency of vibration of the can end is a function of the square root of the pressure difference across the end). When the can end vibrates, it causes pressure variations in the atmosphere and these pressure vibrations form an oscillating acoustic pulse (hereafter called a "ping") that is detected by the microphone 12 and converted to an electrical signal that is used for monitoring cans as hereafter described. The frequency of the acoustic pulse is related to the pressure in the can. FIG. 4 shows the voltage waveform of the signal output of the microphone 12 produced in response to a typical ping of a can with positive internal pressure. A similar voltage waveform occurs when the end of a vacuum packed container is tapped.

The pinging phenomenon also occurs with can ends made of steel. However, a louder ping is obtained from a can with an aluminum end since (1) aluminum has a much lower density and thus is more easily accelerated by the magnetic forces involved, and (2) steel is magnetically attracted by the coil's field and this ferromagnetic attraction force tends partially to cancel out the eddy current repulsion force and thus decreases the ping and (3) aluminum is more electrically conductive. However, even with steel ends, it is possible to produce pings of amplitude sufficient to practice this invention.

Figure 5:
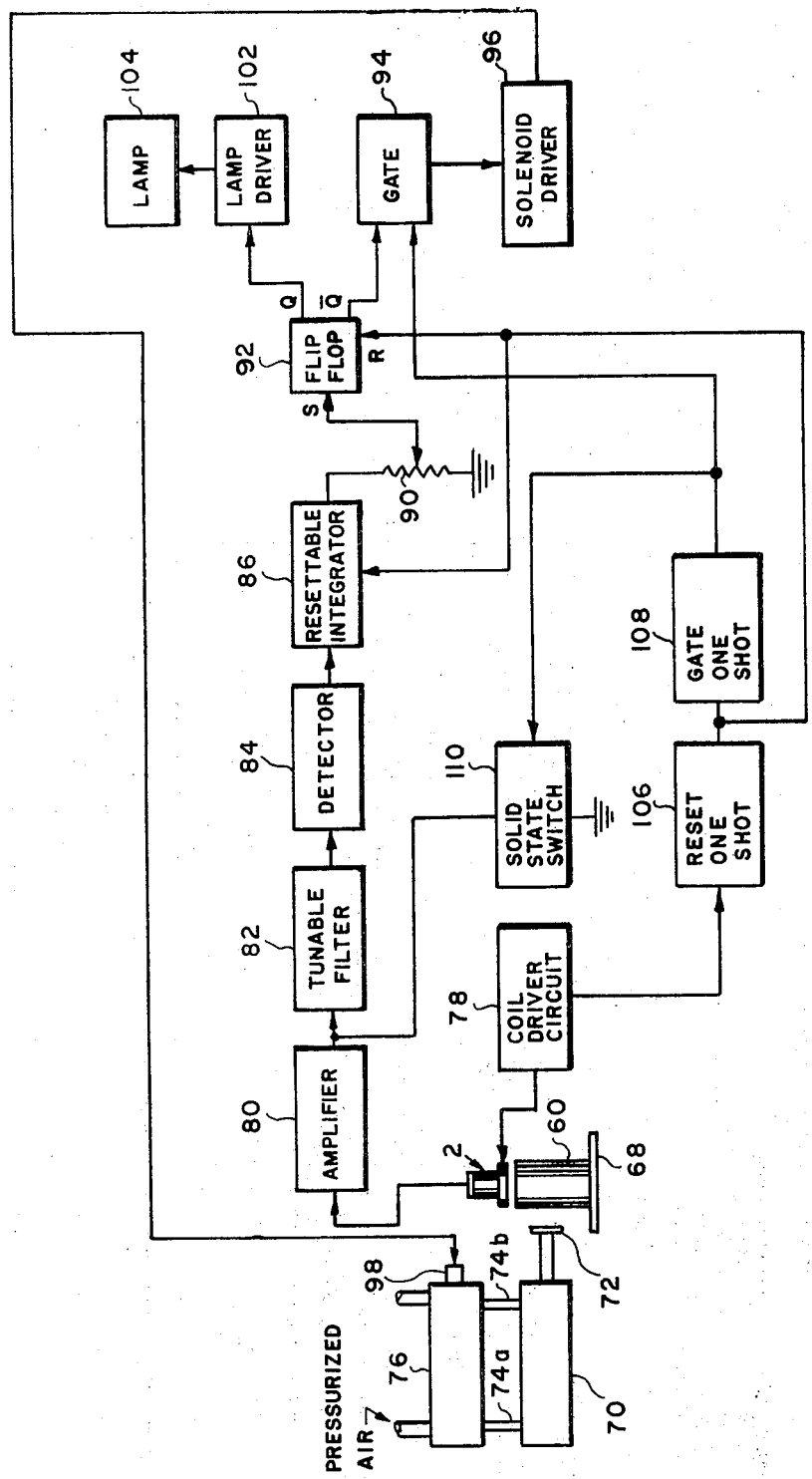
FIG. 5 illustrates one embodiment of the invention referred to hereafter as the single discriminator system.

FIG. 5 illustrates one embodiment of the invention adapted to reject cans that have incorrect fluid pressure. In this figure, the can 60 is shown positioned on a conveyor belt 68 below the transducer-pickup unit 2. Mounted laterally of the conveyor belt is a pneumatic actuator 70 whose piston rod is provided with with a bumper 72 that is used to eject cans from the conveyor. The opposite ends of the cylinder of actuator 70 has inlet ports that are connected via hose lines 74a and b to two of the ports of a four-way solenoid-operated valve 76. A third port of the valve functions to vent air while the fourth port is connected to a pressurized air supply (not shown). The transducer coil of the unit 2 is connected for operation by its drive circuit 78 which may be of the form shown in FIG. 2. The output signal of the microphone of the unit 2 is coupled to an amplifier 80. The level of the output from the amplifier is limited in amplitude, thus rendering the decision making or discriminating process of the system independent of variations in the amplitude of the sound produced by each can. Following the amplifier, the signal is filtered by means of a tunable filter 82 which is set to pass the frequency (actually a narrow frequency band) characteristic of a "good" can and to reject frequencies characteristic of a "bad" can. With this system a can is deemed good if its internal pressure exceeds a predetermined limit, e.g., has a pressure below a selected level in the case of a vacuum packed container and a pressure above a selected level in the case of a container sealed under positive pressure. In practice, the bandwidth of the filter is made adjustable so as to accommodate any normal deviations occurring in cans of a given design filled with a given product. The output of the filter is applied to a detector 84 which converts the a.c. signal to d.c. The d.c. output of the detector is then applied to a resettable integrator 86 under control of a reset signal whose generation is described below. The output of the integrator is an increasing voltage. The output terminal of integrator 86 is applied to a good/bad decision level potentiometer 90. The slider of potentiometer 90 is connected to the S input terminal of an RS type flip-flop 92 having its $\bar{Q}$ output terminal connected to one input of an AND gate 94 whose output line is connected to a solenoid driver circuit 96 that controls operation of solenoid 98 of solenoid valve 76. As an optional measure, the Q output terminal of flip-flop 92 is connected to a lamp driver circuit 102 that controls operation of an indicator lamp 104.

The system of FIG. 5 also includes two one-shot multivibrator pulse generators identified as Reset one-shot 106 and Gate one-shot 108. The one-shot 106 generates a relatively short reset pulse (generally 1-2 milliseconds long) while the Gate one-shot 108 generates a gate pulse of a length appropriate to the ringing time of a can end as explained below in greater detail. The reset one-shot is connected for triggering by and in synchronism with operation of the transducer coil drive circuit 78. With reference to FIG. 2, the imput line of Reset one-shot 106 is connected to output terminal 56 so that it is triggered each time the SCR 44 is triggered. The output of REset one-shot 106 is used to trigger the Gate one-shot 108 and also is applied to the reset terminals of integrator 86 and flip-flop 92. The output of Gate one-shot 108 is applied to one of the input terminals of AND gate 94 and also to a solid state switch 110 which is connected between ground and the output terminal of amplifier 80. Switch 110 is normally closed and thus normally shorts the output of amplifier 80 to ground. However, upon application of a gate pulse from one-shot 108, switch 110 opens and thus allows the output of the amplifier to be applied to filter 82. Thus amplifier 80 and switch 110 effectively function as a gated amplifier. The same result may be achieved by connecting switch 110 between ground and the input terminal of amplifier 80 or the output terminal of filter 82. The gate 94 is adapted to be enabled by the trailing edge of the gate pulse from one-shot 108 and, when so enabled, will produce an output signal effective to operate solenoid driver 96 if the $\bar{Q}$ output line of the flip-flop is high. If the $\bar{Q}$ output line is low, gate 94 will not produce an output effective to operate solenoid driver 96.

It has been determined that when the coil is energized it causes the pickup to produce a relatively large amplitude spurious pulse. This spurious pulse is the result of several factors. One is slight movement of the turns of coil 5 under the influence of the magnetic field, and this movement occurs even though the turns of the coil are embedded in a dense potting compound. A second factor is the generation of voltages as a result of penetration of the microphone, its leads and associated circuitry by the large magnetic field pulse. A third factor is movement of the can end while under the influence of the magnetic field of the coil. This large noise pulse is of short duration typically, about 0.5 to about 1.0 millisecond. It also has been determined that the acoustic ping produced by the can end when resonating freely may last as long as about 20 milliseconds. However, this ping is purest and most intense during the first 5 to 10 milliseconds. The latter portion of the ping pulse tends to be contaminated with noise caused by spurious echoes, reflections and reverberations from other modes of vibration within the can or from structure surrounding the can. Thus it is desirable to delay operation of the discriminator circuit until the spurious noise pulse produced by operation of the transducer has died out and then to operate the circuit for a limited period early in the ping so as to eliminate the aforesaid spurious signals. This control is achieved in the system of FIG. 5. Both one-shots are of the type that is triggered by the trailing end of an input trigger pulse. Hence operation of the gate one-shot 108 is delayed for the time of the pulse output of one-shot 106 which is triggered when the SCR is fired. As a result the signal discriminating channel does not operate until the delay time has expired. Additionally, one-shot 108 is designed so that it will produce a pulse with a typical pulse width of 5-10 milliseconds. As a consequence, the circuit samples and responds to only the most intense and purest portion of the ping produced by the can end vibrating at its resonant frequency. If during the gating period the signal input of the flip-flop 92 from integrator 86 rises above a threshhold value determined by the setting of potentiometer 90, the flip-flop is caused to change states (its $\bar{Q}$ line goes low) and will hold its new state until reset by a new pulse from Reset one-shot 106. If the can is bad, the signal input to amplifier 80 will possess insufficient audio energy at the selected pass-band frequency to operate the flip-flop during the gating period and hence its $\bar{Q}$ line will remain high. As a result on the trailing edge of the gate pulse, the gate 94 will produce a pulse output that causes solenoid driver 96 to operate. The latter in turn actuates the solenoid valve so that the cylinder of actuator 70 will be pressurized with air via line 74a. When this occurs the actuator's piston rod is extended so that bumper 72 will engate and reject the tested can off the conveyor 68. If the can is good, the output on the Q output line of the flip-flop goes high, thereby causing the lamp driver 102 to energize lamp 104. When the flip-flop is reset by the next pulse from one-shot 106, the driver 102 is deactivated and this causes the lamp to be extinguished. Driver 96 is adapted to cause the solenoid 98 to be energized only long enough to cause the actuator 70 to eject a can, after which solenoid 98 is deenergized so that valve 76 will revert to its original position in which it causes the cylinder to shift bumper 72 to its retracted position.

As an alternative measure, the lamp driver 102 may be connected to the output line of gate 94 so that the lamp is energized only when a bad can is detected.

It is to be understood that the system of FIG. 5 is suited for inspection of cans being transported on an assembly line, the transducer being mounted above the conveyor as shown to tap the top ends of successive cans in turn. The pinger circuit, i.e., the transducer drive circuit, energizes the transducer once for each can and may be actuated by operation of photoswitch 52 or by operation of switch 54. Photoelectric control of the pinger circuit is described below in connection with the embodiment of FIGS. 6 and 7. By way of example, the switch 54 of FIG. 2 may be a feeler switch located next to the conveyor and adapted to be operated by each can on the belt as the can approaches the transducer-pickup unit 2.

The salient feature of the system of FIG. 5 and also of the other embodiments of the invention hereafter described is the fact that free rather than forced vibrations of the can end are employed to determine the fluid pressure in the can. Each can end is struck with a magnetically generated, consistent character pulse of force which, after its removal, causes the can to vibrate freely at its natural frequency. Furthermore, only the signal of the ringing of the can at its natural frequency, rather than the acoustic pulse put out by the can during the time it is being forced by a magnetic field, is processed by the circuit to evaluate the internal pressure in the container. Eliminating the acoustic pulse produced by the can when it is subjected to the force of the magnetic field is important since the vibrations of that pulse are usually different than that produced by ringing of the can at its natural frequency.

FIGS. 6 through 9 relate to a second and preferred embodiment of the invention adapted for inspecting the internal pressure of cans on a moving conveyor. This embodiment is hereafter called the "dual frequency discriminator system" to distinguish it from the system of FIG. 5. This preferred embodiment is designated to cancel any amplitude variations resulting from unequal pings, changes in the spacing between the transducer-pickup unit and the can, and other factors, as well as providing a proportional indication of the can pressure. This proportional indication feature enables the operator of a production line to determine the limits of normal can-to-can variations and to adjust the rejection point to suit the product being inspected.

Figure 6:
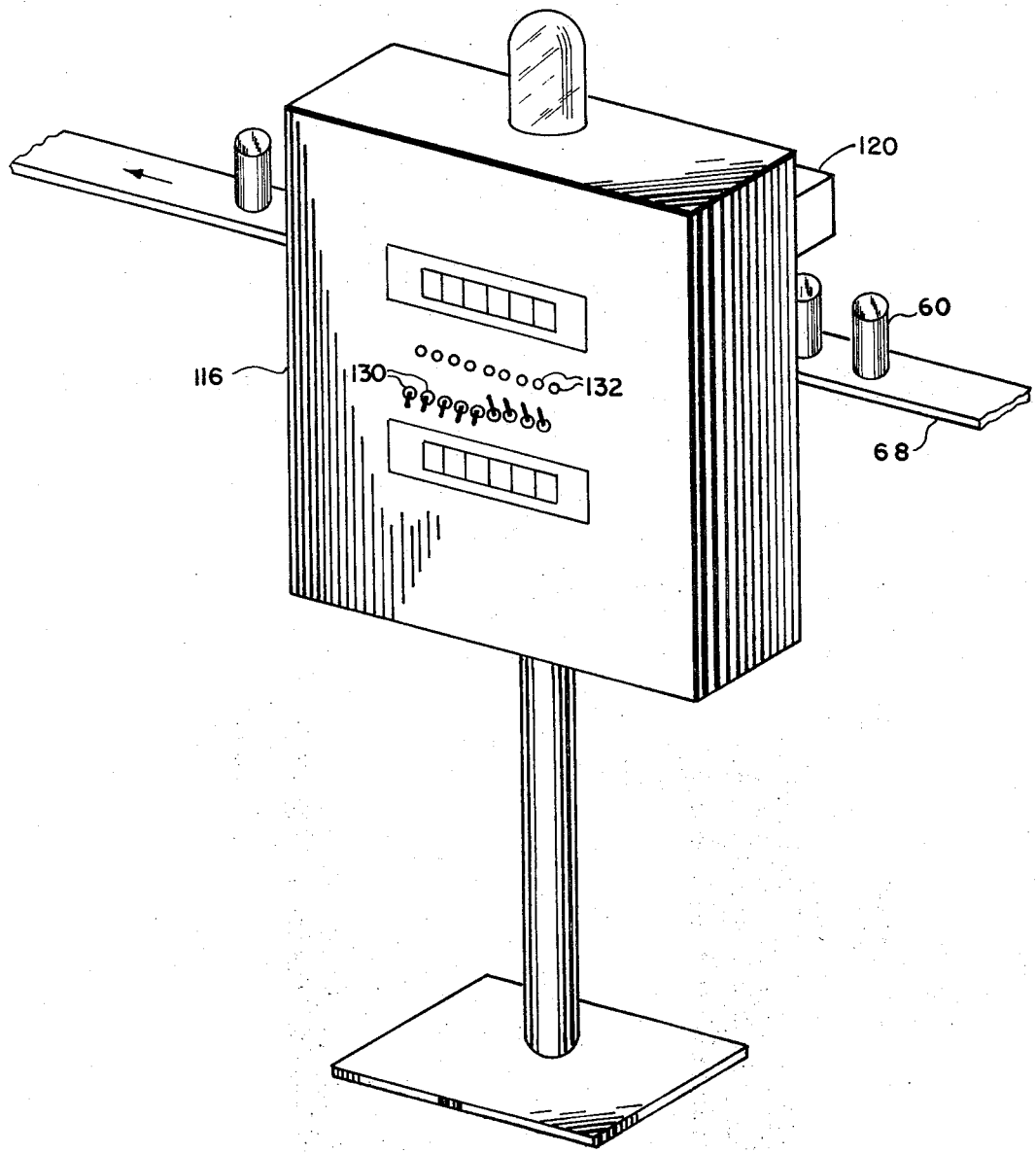
FIG. 6 is a fragmentary elevational view of apparatus embodying the invention for inspecting containers on a moving conveyor.
Figure 7:
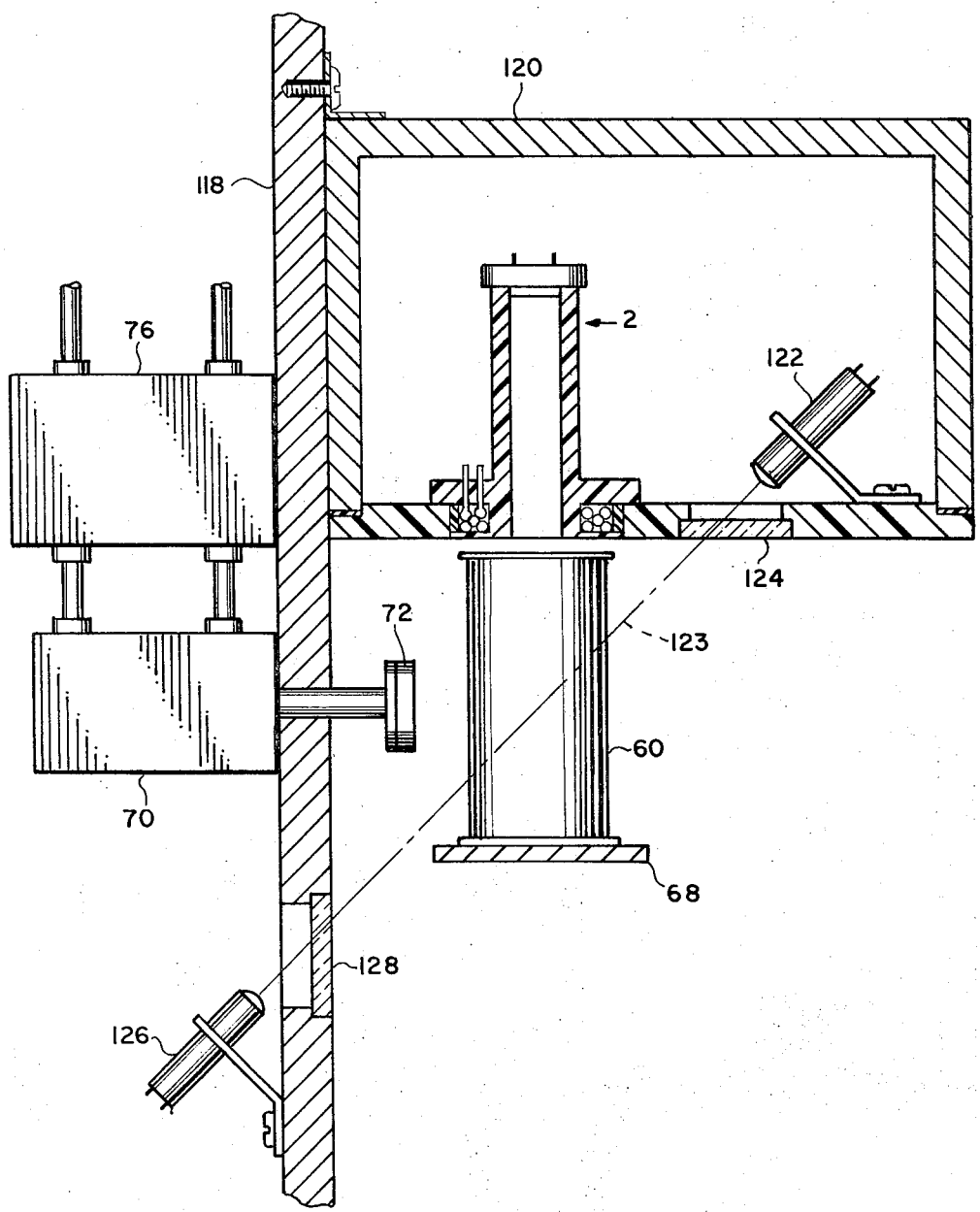
FIG. 7 is a vertical sectional view of the apparatus of FIG. 6.

Referring now to FIG. 6, the apparatus comprises a console 116 which is mounted on an appropriate pedestal adjacent to moving conveyor 68 which is used to transport a plurality of sealed cans, e.g., beer cans 60. Referring now to FIG. 7, supported on one wall 118 of the console over the conveyor 68 is an enclosure 120 in which is mounted the transducer-pickup unit 2. The unit 2 is mounted in an opening in the bottom wall of the enclosure directly over the conveyor 68. Supported on the inner side of the console wall 118 are the pneumatic actuator 70 and the solenoid-operated valve 76. Actuator 70 and valve 76 are interconnected as described above in connection with FIG. 5. The actuator's piston rod extends through and is slideable in wall 118.

Also mounted in the enclosure 120 is a light source 122. The latter is mounted at a 45° angle to the vertical and is disposed so as to transmit a beam of light 123 across the path traveled by the cans 60 on the conveyor. Enclosure 120 is provided with a transparent (preferably plastic) window 124 which permits the light beam to be directed at cans on the conveyor while sealing off the enclosure so that dust particles and water cannot enter. Cooperating with the light source is a photo-electric unit 126 which is located within the console 116 on the inner side wall 118. The photoelectric unit 126 also is mounted at a 45° angle to the vertical and is aligned with the light source 120 so that it will receive and be responsive to the light beam when the latter is not being interrupted by a can on the conveyor. Wall 118 has a transparent window 128 which permits the light beam to impinge on the lens of the photoelectric unit 126 while keeping out water from the interior of the console. It is to be noted that light source 122 and photoelectric unit 126 are mounted upstream of the transducer-pickup unit 2 at a point, determined in accordance with the diameter of the can 60, which allow the drive circuit for the transducer to be actuated just as the can which interrupts the beam passes beneath the transducer coil. Typically light source 122 and the photoelectric unit 125 are located about 0.5 can diameter upstream of the transducer pickup unit. The photoelectric unit 126 (which corresponds to photoswitch 52 of FIG. 2) may comprise a phototransistor or photodiode or other suitable photoelectric device capable of being connected so as to fire the SCR 44 of the transducer drive circuit.

Mounted on the front panel of the console 116 is a plurality of toggle switches 130 and a like plurality of lights 132 which preferably are light-emitting diodes. Although not shown, it is to be understood that the console also contains the transducer drive circuit (FIG. 2) as well as the circuits of FIGS. 8 and 9.

Figure 8:
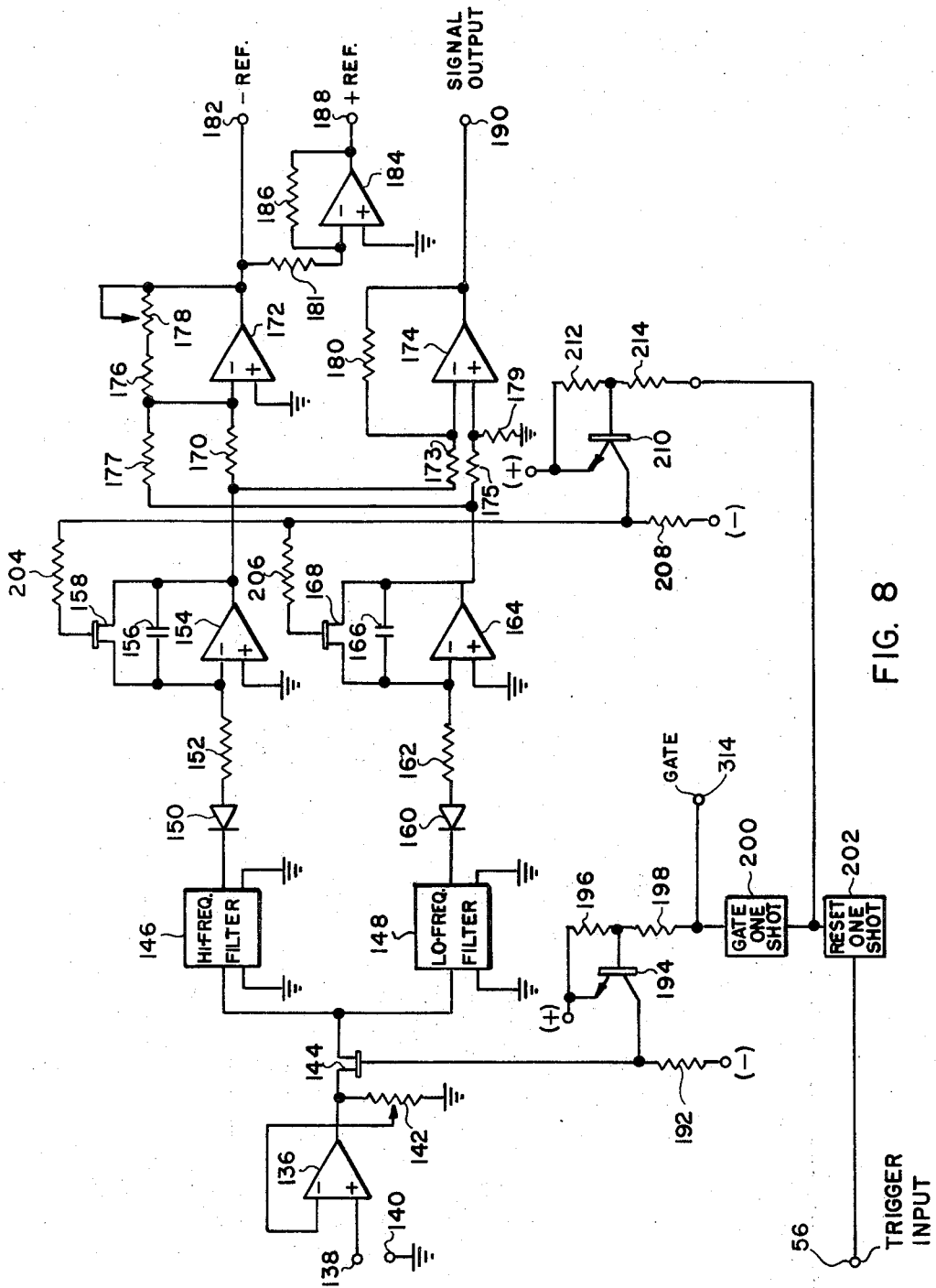
FIGS. 8 and 9 illustrate discrete portions of a modification of the invention referred to hereafter as the multiple discriminator system.

FIG. 8 illustrates the dual frequency discriminator. It comprises an operational amplifier 136 having its non-inverting input terminal connected to a terminal 138. The output leads of the microphone of the transducer-pickup unit 2 are connected between terminal 138 and a second grounded terminal 140. The inverting input line of amplifier 136 is connected to the slider of a gain control potentiometer 142. One end of the resistor element of the potentiometer is connected to ground and the other end is connected to the amplifier's output terminal. The output terminal of amplifier 136 also is connected by way of a field-effect transistor 144 to input terminals of two low Q tuned filters 146 and 148. For a pressurized beverage can or an evacuated food can, the high frequency filter 146 is tuned so that its center frequency is approximately that of a "good" can, while the low frequency filter 148 is tuned so that its center frequency is approximately the same as the frequency of a "bad" can.

The output of the filter 146 is applied via a diode 150 and a resistor 152 to the inverting input terminal of an operational amplifier 154. The non-inverting input terminal of that amplifier is grounded. Connected in parallel with each other between the inverting input terminal and the output terminal of amplifier 154 are a capacitor 156 and a field-effect transistor 158. The output of filter 148 is coupled via a diode 160 and a resistor 162 to the inverting input terminal of another operational amplifier 164. The non-inverting input terminal of that amplifier is grounded. A capacitor 166 and a field-effect transistor 168 are connected in parallel with each other between the output terminal and the inverting input terminal of amplifier 164.

The output terminal of amplifier 154 is connected via a resistor 170 to the inverting input terminal of an operational amplifier 172 and also through resistor 173 to the inverting input terminal of a difference amplifier 174. The non-inverting input terminal of amplifier 172 is grounded. The non-inverting input terminal of amplifier 174 is connected through resistor 175 to the output terminal of amplifier 164, as is the inverting input of amplifier 172 through resistor 177. Connected across the output terminal and the inverting input terminal of amplifier 172 is a fixed resistor 176 and a variable resistor 178. A fixed resistor 180 is connected between the output and inverting input terminals of amplifier 174. A resistor 179 is connected between the non-inverting terminal of operational amplifier 174 to ground. The output line of amplifier 172 is connected to an output terminal 182 which is designated "−REF" to indicate that the output at that point is a negative reference signal. The output line of amplifier 172 is also connected through resistor 181 to the inverting input terminal of an operational amplifier 184 whose non-inverting input terminal is grounded. A fixed resistor 186 is connected between the output terminal and the inverting input terminal of amplifier 184. The output line of amplifier 184 is connected to a terminal 188 which is designated "+REF" to indicate that a positive reference signal appears at that terminal. The output line of amplifier 174 is connected to a third output terminal 190 at which appears a signal output representative of the can being tested.

The gate electrode of transistor 144 is connected via a fixed resistor 192 to a source of negative d.c. voltage. It is also connected to the collector of a transistor 194 whose emitter is connected to a source of positive d.c. voltage and is also connected via a pair of resistors 196 and 198 to the output terminal of a gate one-shot 200. The base of transistor 194 is connected between resistors 196 and 198. The input terminal of the gate one-shot 200 is connected to the output terminal of a reset one-shot 202 whose input terminal is connected to the terminal 56 of the transducer drive circuit shown in FIG. 2.

The gate electrodes of transistors 158 and 168 are connected via isolating resistors 204 and 206 respectively and a series resistor 208 to a source of negative d.c. voltage. The junction of resistor 208 with resistor 204 and 206 is connected to the collector of a transistor 210. The emitter of transistor 210 is connected to a positive d.c. voltage supply and also to its base by way of a resistor 212. The output terminal of the reset one-shot is connected to the base of transistor 210 via a resistor 214.

The level of the output from amplifier 136 (which is non-inverting) is adjusted by the setting of potentiometer 142, to provide adequate signal for the decision making or discriminating process of the system over the range of variations in the amplitude of the sound produced by each can. The diodes 150 and 160 connecting the filters to amplifiers 154 and 164 serve as detectors to provide d.c. outputs from the a.c. signals passed by the filters. The amplifiers 154 and 164, together with the capacitors and transistors connected between their signal input and output lines, act as resettable integrators. Since amplifier 174 is a difference amplifier, its output is the algebraic sum of the outputs of amplifiers 154 and 164.

The transistor 144 is normally non-conducting and is turned on briefly during the gate period to pass only the desired portion of the signal obtained from the microphone pickup. The transistors 158 and 168 also are normally non-conducting and are turned on during the reset period when it is desired to prepare (reset) the integrators to accept the signals passed by the filters during the gate period.

Operation of the circuit of FIG. 8 is as follows: Assume that the end of a carbonated beverage can pings in response to a magnetic force produced by the energization of the transducer coil. The initial spurious pulse produced by the magnetic field and the free vibration pinging of the can end are detected by the microphone which produces a corresponding a.c. signal that is applied across terminals 138 and 140. As a result, amplifier 136 produces a limited amplitude output signal which can be applied to the filters only if transistor 144 is rendered conductive. When the SCR of the transducer drive circuit fires, the trigger signal appearing at terminal 56 causes the reset one-shot 202 to generate a 1 millisecond reset pulse. This reset pulse in turn causes the gate one-shot 200 to generate a 5 millisecond pulse after a delay of 1 millisecond. The output of one-shot 200 causes transistor 194 to conduct, thereby changing the bias on the gate of transistor 144 enough to cause the latter to conduct. The 1 millisecond delay in driving transistor 144 to conduction is enough to block the acoustic noise pulse generated by energization of the transducer coil. Transistor 144 stays on for the duration of the period of the gate pulse and then goes off, with the result that only a selected most meaningful part of the signal produced by free vibration of the can end is passed to the filters. As previously noted, filter 146 passes those frequencies characteristic of a good can while filter 148 passes those frequencies characteristic of a bad can. The signal outputs of the filters 146 and 148 are rectified and applied to integrating amplifiers 154 and 164 respectively. The transistors 158 and 168 are normally non-conducting. These are turned on briefly before the gating transistor is switched on, so as to reset the integrators. This is achieved by application of the reset pulse from one-shot 202 to the base of transistor 210. The latter is normally off and is turned on by the reset pulse. When this occurs, the bias on the base electrodes of transistors 158 and 168 is changed enough to cause the latter to conduct and thereby discharge capacitors 156 and 166. Transistors 158 and 168 stay on for only about 1 millisecond, i.e., the duration of the reset pulse. Thus the integrators 154 and 164 are in a reset condition when the filters begin to pass selected frequencies of the signal output from amplifier 136. The integrators produce increasing ramp signal outputs during the gating period.

The output of integrators 154 and 164 are summed at the inverting input of amplifier 172 to produce a negative reference signal at terminal 182. The output of amplifier 172 also is inverted by amplifier 184 to produce a positive reference signal at terminal 188. At the same time amplifier 174 provides an output according to the difference between the outputs of integrators 154 and 164. Difference amplifier 174 produces a zero output when the integrator outputs are equal, i.e., when the can being tested has a pressure near the midpoint of the pressure range corresponding to the frequency range determined by the band pass limits of filters 146 and 148. If the pressure level of the can is more nearly that of a good can, the level of the signal appearing at terminal 190 will be less positive. If the pressure level of the can is more nearly that of a bad can, the signal at terminal 190 will be more positive. The reference signals 182 and 188 are utilized by the indicator circuit of FIG. 9 to render the decision making or discriminating process of the system independent of variations in the amplitude of the sound produced by each can.

Figure 9:
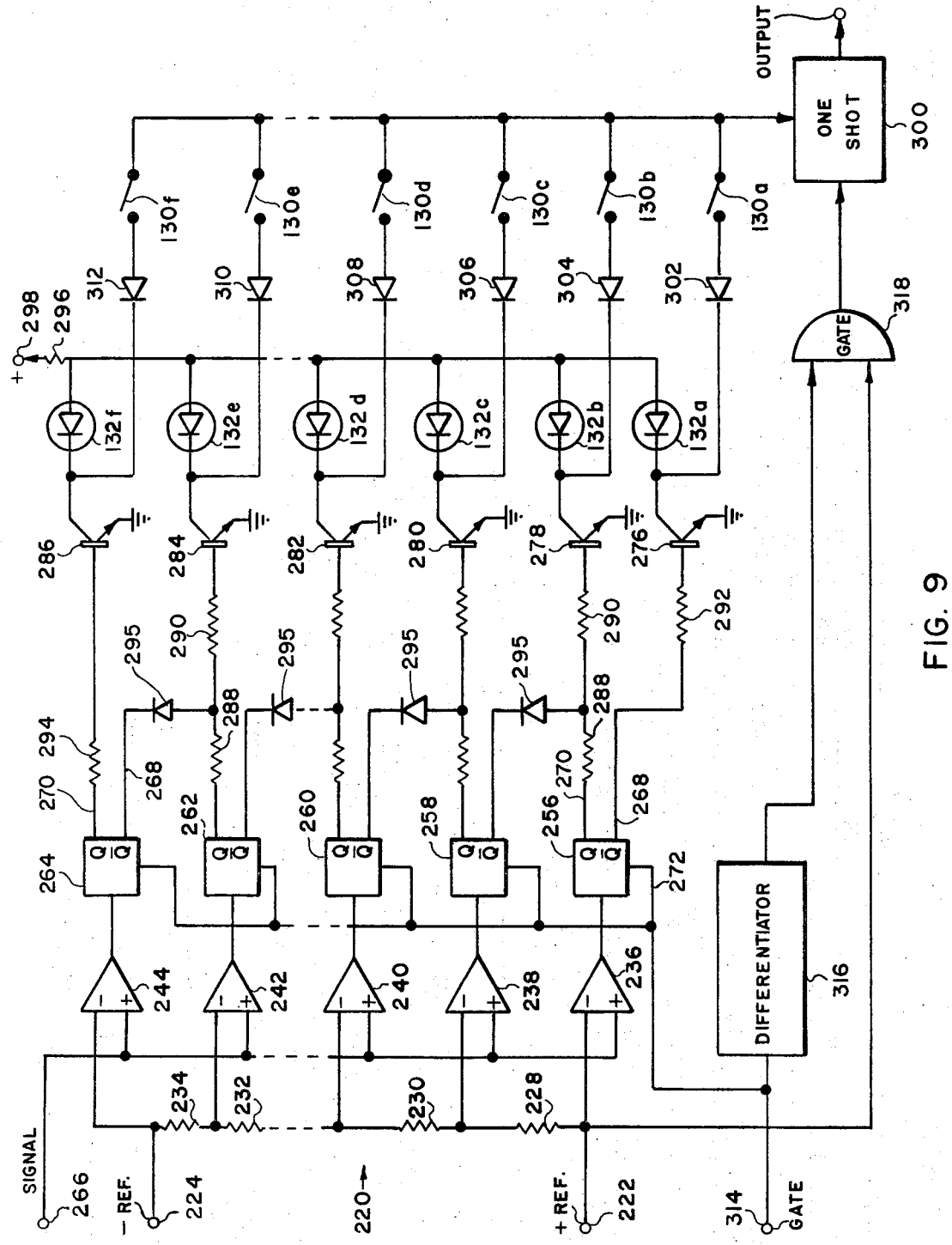

FIG. 9 indicates a preferred form of circuit for operating the indicator lights 132 (FIG. 6) and operating the can rejecter actuator 70. It is to be understood, as indicated by the broken lines in FIG. 9, that the number of signal processing channels described below can be varied according to the desired degree of proportional indications of can pressure. The circuit of FIG. 9 comprises a voltage divider network 220 arranged to provide signal inputs to a plurality of signal processing channels. Divider network 220 comprises two input terminals 222 and 224 across which is connected a series of suitable value resistors 228-234. As shown, the circuit also comprises five operational amplifiers 236-244 and five bistable latching semiconductor memory units 256-264. Amplifier 236 has its inverting input line connected to the minus reference terminal 222. The corresponding input lines of amplifiers 238-242 are connected between successive pairs or resistors 238-234 while that of amplifier 244 is connected to terminal 224. The non-inverting terminals of amplifiers 236-244 are coupled together and connected to a third terminal 266.

The output lines of amplifiers 236-244 are connected to the input lines of memory units 256-264 respectively. By way of example, the array of memory units may consist of a plurality of type SN7475 modules produced by Texas Instruments of Dallas, Tex. Each memory unit has two output lines 268 and 270 and is enabled or disabled according to the level of the signal appearing on its control line 272 (in fact, each memory has two control lines which are energized by a common control signal, but only one control line is shown for the sake of drawing simplicity). The construction of these memory units is such that if the signal on control line 272 goes high, the signal level on output lines 270 and 268 will go high and low respectively if the signal on the input line goes high; and will go low and high respectively if the signal on the input line goes low. If the signal on control line 272 goes low, the memory is latched, i.e., the signals on output lines 270 and 268 will stay as they are and are unaffected by subsequent signal changes on the input line.

The memory units are interconnected and coupled to light driving transistors 276-286. Output lines 270 of memory units 256-262 are connected by duplicate pairs of resistors 288 and 290 to the bases of transistors 278-284 respectively, while lines 168 and 270 of memory units 256 and 264 are connected by resistors 292 and 294 to the bases of transistors 276 and 286 respectively. The junction of resistors 288 and 290 associated with memory unit 256 is connected by a diode 295 to the output line 268 of memory unit 258. Corresponding diode coupling is effected between successive ones of the memory units 258-264.

The emitters of transistors 276-286 are grounded while their collectors are connected to the cathodes of light-emitting diodes 132A-F respectively. The anodes of these diodes are connected via a dropping resistor 296 and a terminal 298 to a positive d.c. voltage supply (not shown). The collectors of transistors 276-286 also are connected in parallel to the input line of a one-shot multivibrator 300 via separate diodes 302-312 and toggle switches 130A-F.

The circuit of FIG. 9 also includes an input terminal 314 which is connected to the control lines 272 of the memory units and also to a differentiator 316. The latter in turn is connected to one of the input lines of a gating 318. The latter has a second input line that is connected to terminal 222, while its output line is connected to an enable input terminal of the one-shot 300. The output line of one-shot 300 is connected to the solenoid of air valve 76.

Operation of the circuit of FIG. 9 will now be described in connection with inspection of cans having a positive internal pressure. The positive and negative reference signals appearing at terminals 188 and 182 and the signal output at terminal 190 (FIG. 8) are applied to terminals 222, 224 and 266 respectively. The output of gate one-shot 200 also is applied to terminal 314. The amplifiers 236-244 will produce an output when the signal voltage on their non-inverting lines exceeds the reference voltage on their inverting lines. Since their reference voltage inputs differ incrementally, amplifier 238 requires a greater signal at terminal 266 than amplifier 236 to produce an output. Similarly, amplifiers 240, 242, and 244 each require respectively greater signal levels at terminal 266 to produce an output. The output lines 270 of memory units 256-264 will go high when a gating signal is impressed on their control lines 272 and an input of suitable level is received from the amplifiers 236-244 respectively. If the signal at 266 is insufficient to cause the line 270 of memory unit 256 to go high, transistor 276 will conduct and thereby activate the LED 132A. If the signal at 266 is high enough to cause line 270 of memory unit 256 to go high, transistor 276 will not activate LED 132A but transistor 278 will conduct to activate LED 132B. If the signal at 266 is high enough to cause line 270 of memory unit 258 to go high, transistor 280 will conduct to activate LED 132C. At the same time, line 268 of memory unit 258 will go low, causing the voltage of the junction of resistors 288 and 290 between memory unit 256 and transistor 278 to go low enough to prevent transistor 278 from conducting enough to operate LED 132B. Similarly, if the signal at 266 is sufficient to cause the line 270 of memory unit 260 to go high but not high enough to cause the line 270 of memory input 262 to go high, LED 132D will go on and the light-emitting diodes 132A-C will stay off. A still higher signal at 266 is required to turn on LED 132E. LED 132F is turned on when the output line 270 of memory unit 264 goes high. Thus which LED is turned on depends on the level of the signal at 266, which in turn depends on the resonant frequency of the can end that is pinged. The higher the pressure level in the can, the more negative will be the signal level at terminal 266. Hence the light-emitting diodes 132A-F provide relative or proportional indications of the pressure level in the cans. By observing which of the diodes 132A-F are activated, an operator can determine the degree of "goodness" of cans being tested and can determine the frequency of occurrence of a bad can or whether there is any upward or downward trend in can pressures. Switches 130A-F allow the operator to select which cans are acceptable and which are not. If one of these switches is closed and the associated one of transistors 276–286 is rendered conductive as a result of the pinging of a can, the closed switch will cause a signal to appear on the input line to the one-shot 300. At the same time gate 318 will produce an enabling signal for the one-shot, with the result that the latter will fire and cause the rejecter mechanism to reject the pinged can from the conveyor. It is to be noted that the differentiator 316 delays operation of gate 318 until the end of the gate pulse period. This is essential since the integrators are operating during the gate period. Applying the positive reference signal at terminal 222 to the gate assures that the one-shot 300 will not fire unless a significant voltage, indicative of the ringing of a can end, is generated by the discriminator circuit. In practice, the operator determines the minimum can pressure that is acceptable and then closes whichever ones of the switches 130A-F are connected to LEDS 132A-F that are turned on in response to signals generated by pinging non-acceptable cans. Thus if switches 130A-D are closed, a can will be rejected only if its can pressure is less than that required for the discriminator circuit to produce a signal level at terminal 266 sufficient to cause transistor 284 to be rendered conductive.

When tapping containers which are vacuum packed rather than pressurized, the resonant frequency becomes lower as the degree of vacuum within the container becomes less. Therefore the apparatus described herein can be similarly utilized to determine the degree of vacuum within a vacuum packed container and reject those containers having less vacuum than the value selected by means of switches 130A-F. Generation and use of the positive and negative reference signals as above described renders the decision-making process independent of variations in the absolute value of the amplitude of the signals passed by the filters which are caused by factors other than variations in can pressure, e.g., amplitude variations due to unequal taps or changes in transducers-to-can spacing.

Figure 10:
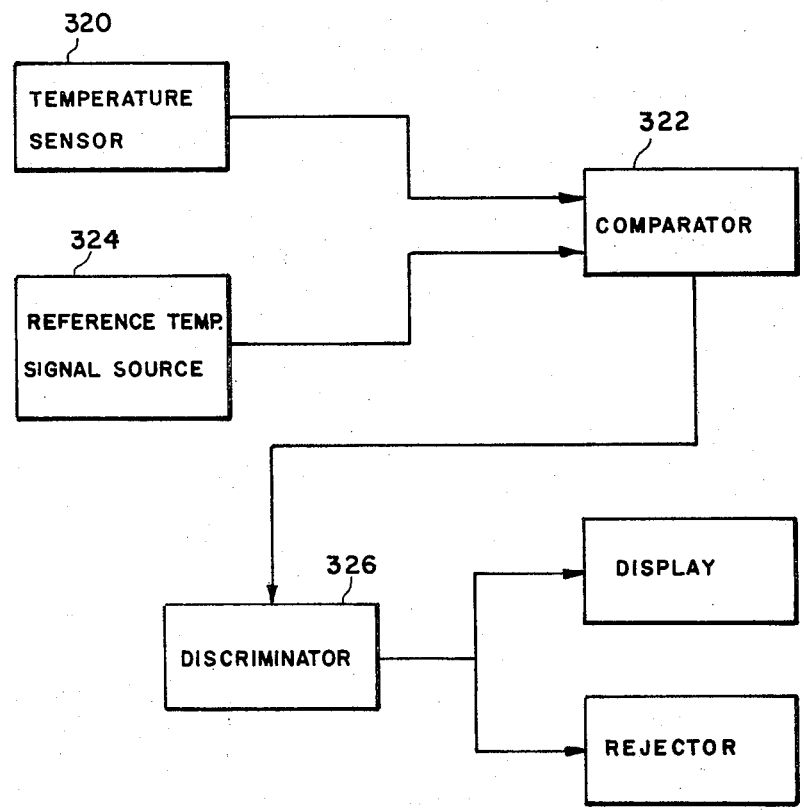
FIG. 10 illustrates circuit means for providing temperature compensation.

It also has been determined that the pressure in a can will vary with temperature. Thus, for example, a carbonated beverage can that has three volumes of dissolved $CO_2$ and exhibits a pressure of 38 psi at 70° F, will have a pressure of 13 psi at 35° F and a pressure of 42 psi at 75° F. Accordingly, it is possible that a can might be rejected as having insufficient pressure when in fact it is properly pressurized and the low pressure indication is due to the can being at a reduced temperature. This possible error is avoided by modifying the systems above-described in accordance with FIG. 10. A thermistor or other quick-acting temperature sensor 320 is mounted adjacent to the conveyor line in position to sense the temperature of the cans. The temperature sensor provides an analog electrical signal which is compared in a comparator 322 with a reference signal (derived from a signal source 324) corresponding to that generated by the temperature sensor at preselected temperature, e.g., 70° F. The comparator may be a difference amplifier. The error or compensating signal output of the comparator is applied to the discriminator circuit 326 (e.g., the circuit of FIG. 5 or 8) in a manner so as to adjust its response in accordance with the error signal. Thus, for example, if cans with a positive pressure are being inspected at a temperature below the temperature at which they are normally inspected, the error signal will be used to increase the output of the integrator of FIG. 5 by an amount which is a function of the difference between the outputs of sensor 320 and reference signal source 324. In the case of the discriminator of FIG. 8, the error signal is employed to increase the input to the reference amplifier 172. If the cans are being inspected at a temperature above that at which they were filled, the error signal will be such as to decrease the output of the integrator of FIG. 4 or the input to the reference amplifier 172 by an amount to compensate for the temperature differential. Thus the LED display circuit of FIG. 9 will not provide an erroneous indication and the rejector circuit of FIG. 5 or FIG. 9 will not eject a good can.

Figure 11:
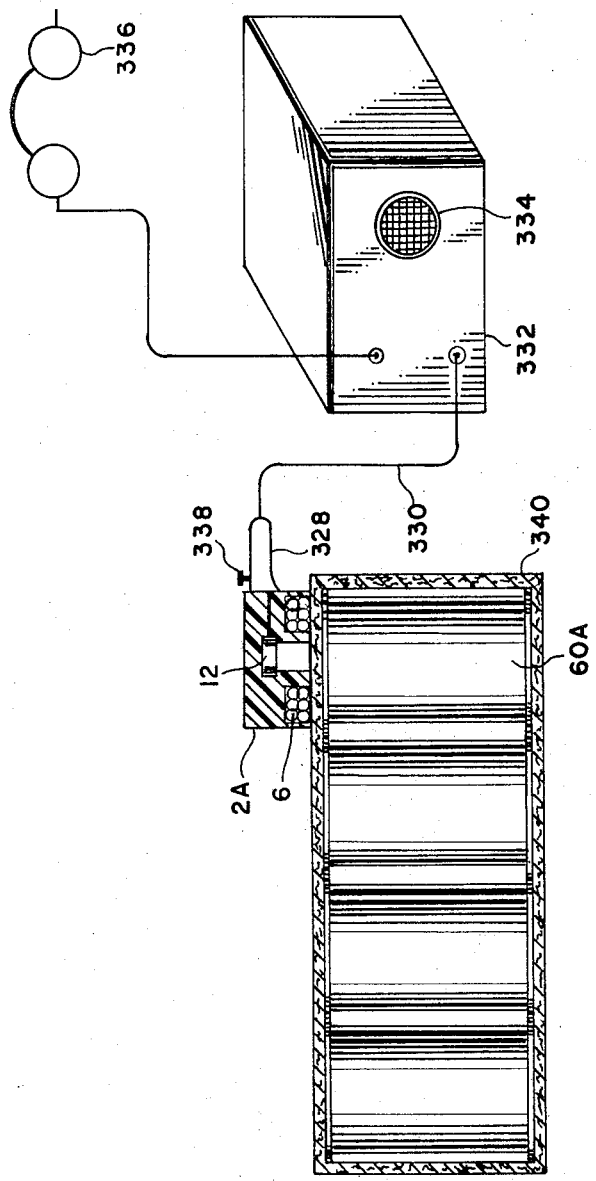
FIG. 11 illustrates another modification of the invention.

FIG. 11 shows another modification of the invention. In this case the transducer-pickup unit 2A is portable and its housing is provided with a handle 328 which contains one end of a multi-wire cable 330 that connects the transducer coil and microphone terminal to a housing 332 which contains a circuit that comprises the coil drive circuit 78, amplifier 80, filter 82, one-shots 106 and 108, and solid state switch 110 connected as shown in FIG. 5. The output of filter 82 is connected to a pair of earphones 336. Handle 328 contains a normally open switch (not shown) which corresponds to switch 54 of FIG. 2 and is closeable by depressing a spring-biased push button 338. The transducer unit 2A may be positioned over a can, e.g., over a can 60A in a sealed cardboard case 340, and the button 338 depressed to fire the SCR of the transducer coil's driver circuit. Assuming that the filter 82 is now tuned to the band-pass frequency encompassing boty good and bad cans, the operator is able to tell by listening to the sound emitted from speaker 334 or earphones 336, whether the can contains the desired pressure. The operator's ability to discriminate is enhanced by the fact that the amplifier is gated to block the noise pulse by the magnetic field and to pass only a selected portion of the acoustic signal produced by the freely vibrating can end.

It also is contemplated that the embodiment of FIG. 11 may include, for example, detector 84, integrator 86, flip-flop 72, lamp driver 112 and lamp 104, so that the operator need not rely on the sound from speaker 334 or earphones 336 to determine if the can being inspected is a good can. Instead the pressure of a good can would be indicated by energization (or failure to accomplish energization) of a lamp 104. The latter may be mounted to housing 332. Obviously the discriminator circuit of FIG. 8, with or without the circuit of FIG. 9, may be incorporated in the embodiment of FIG. 11.

It should be noted that the invention is not limited to inspection of sealed metal cans. It also may be used to inspect containers made of glass or other materials that are sealed by a metal cap, e.g., a vacuum-packed jar of instant coffee or baby food. Furthermore, it is not necessary to tap the lid or end of a container. It also is possible to tap a side wall of a vacuum or positive pressure-packed container. The important thing is to tap a portion of the container that will vibrate at a resonant frequency that is a function of the internal pressure of the container.

Another thing to be understood is that the pickup need not be a microphone. All that is required is a pickup that will produce a signal with a frequency that is a function of or is related to the resonant frequency of the container that is magnetically tapped. Thus, for example, the pickup may be capacitive, inductive or resistive in its mode of response. Furthermore the pickup need not be mechanically attached to the transducer coil assembly.

Understanding of the invention may be facilitated by considering a typical application of the dual frequency discrimination system of FIGS. 8 and 9. Assume that the system is to be used to test 12 oz. cans of beer where the cans are made of aluminum. Typically each can contains three volumes of dissolved $CO_2$ and if properly filled and sealed has a pressure of 38 psi at 70° F. Assume also that any can having a pressure of below 30 psi is "bad" and those with a pressure of 30 psi and above are "good." Assume also that the tapped end of a can with a pressure of 38 psi will resonante with a peak energy at a frequency of about 4 kHz while that of a can with a pressure of about 30 psi will resonate with peak energy at a frequency of about 2 kHz. In such cases, the filters 146 and 148 (which have a relatively low Q, about 1.5–2) will be tuned to center frequencies of about 4 and 2 kHz respectively, with the former having a band pass frequency of about 3–5 kHz and the latter having a band pass frequency of about 1–3 kHz. By appropriately closing selected ones of switches 130 (a–f), the system can be made to reject those cans that do not qualify as "good."

What is claimed is:

1. Apparatus for monitoring the internal pressure within an enclosure having at least a flexible wall portion comprising:
    a transducer coil that is positionable adjacent to said resilient wall portion;
    means for producing and discharging a pulse of electrical energy into said coil, which energy so discharged produces an electromagnetic pulse of force that deflects said wall portion and thereby generates a vibrational wave in said enclosure with said wall portion vibrating at a frequency that is a function of said internal pressure;
    pickup means for generating an oscillating electrical signal in response to the vibrations of said wall portion;
    circuit means responsive to said electrical signal for monitoring the frequency of said signal; and
    means for gating said electrical signal so that said circuit means is prevented from responding to that portion of said electrical signal that is generated during the time that said wall portion is subject to said pulse of force.

2. Apparatus according to claim 1 wherein said circuit means comprises means responsive to said gated electrical signals for producing an output signal indicative of the magnitude of said internal pressure.

3. Apparatus according to claim 2 wherein said last-mentioned means is adapted to produce said output signal in accordance with the energy content of said electrical signal within a predetermined frequency range.

4. Apparatus according to claim 1 wherein said circuit means comprises means for producing an output signal as a function of the energy content of said gated electrical signal within a predetermined frequency range.

5. Apparatus according to claim 1 wherein said pickup means is adapted to generate said oscillating electrical signal in response to the acoustical energy generated by the vibrations of said wall portion.

6. Apparatus for monitoring the internal pressure within an enclosure having at least a flexible metal wall portion comprising:
    a transducer coil that is positionable adjacent to said resilient wall portion;
    means for producing and discharging a pulse of electrical energy into said coil, which energy so discharged produces a magnetic field that induces eddy currents in said wall portion, said magnetic field and eddy currents interacting to produce a pulse of force that causes said wall portion to accelerate rapidly away from said coil and to vibrate at a frequency that is a function of said pressure;
    pickup means mounted adjacent said transducer coil for producing electrical signals in response to and varying in accordance with the vibrations of said wall portion;
    circuit means responsive to said electrical signals for discriminating said signals within a predetermined range of frequencies to determine the resonant frequency of said resilient wall portion; and
    means for gating said electrical signals so that said circuit means is prevented from responding to those signals that are generated during the time that the said wall portion is subjected to said pulse of force.

7. Apparatus according to claim 6 wherein said circuit means comprises means for determining the peak frequency of said electrical signals.

8. Apparatus according to claim 7 wherein said circuit means includes means for producing an output signal when the peak frequency of said electrical signals is outside of a predetermined frequency band.

9. Apparatus according to claim 8 further including means for providing an indication in response to said output signal.

10. Apparatus according to claim 6 wherein said circuit means includes:
    a band-pass filter tuned to a selected frequency band;
    means for applying said electrical signals as an input to said filter;
    integrating means;
    means for applying the signals passed by said filter to said integrator; and
    output means coupled to said integrator and responsive to the output thereof for providing an output signal when the output of said integrator reaches a predetermined level.

11. Apparatus according to claim 10 further including means for operating said integrator so that only a selected portion of said signal is integrated.

12. Apparatus according to claim 10 wherein said means for applying said electrical signals to said filter comprises an amplifier.

13. Apparatus according to claim 12 wherein said amplifier is set to limit the amplitude of the input to said filter.

14. Apparatus according to claim 12 wherein said gating means is adapted to gate the output of said amplifier.

15. Apparatus according to claim 10 further including means for resetting said integrator when said pulse of electrical energy is discharged into said coil.

16. Apparatus according to claim 6 wherein said circuit means comprises:
first and second band-pass filters with one of said filters tuned to a first frequency band and the other of said filters tuned to a second different frequency band;
means for applying said electrical signals as inputs to both of said filters;
means for separately detecting and integrating the filtered signal outputs of both of said filters; and
output means for producing an analog signal that is representative of the resonant frequency of said wall portion and varies in accordance with changes in the magnitude of the difference in amplitude between the outputs of said detecting and integrating means.

17. Apparatus according to claim 16 further including means responsive to the output of said output means for providing an indication of the resonant frequency of said wall portion.

18. Apparatus for monitoring the internal pressure within containers having at least a resilient wall portion and for providing an output indicative of whether the magnitude of said pressure conforms to a predetermined standard, comprising:
a transducer coil;
pulsing means for electrically energizing said coil with a current pulse so that said coil will generate an electromagnetic pulse of force on the resilient wall portion of one of said containers when the resilient wall portion of said one container is positioned proximate to said transducer coil, whereby said resilient wall portion is caused to vibrate at a frequency which is a function of the pressure in said one container;
pickup means adjacent said transducer coil for producing signals in response to and oscillating as a function of the vibrations of said vibrating wall portion;
frequency discriminating means for receiving and discriminating said signals within a predetermined range of frequencies to determine the resonant frequency of said vibrating wall portion and;
means for gating said frequency discriminating means so that it is substantially non-responsive to signals generated by said pickup means while said resilient wall portion is under the influence of the electromagnetic pulse of force generated by said coil.

19. Apparatus according to claim 18 further including means for operating said frequency discriminating means during only a portion of the time that said wall portion is vibrating freely.

20. Apparatus according to claim 18 wherein said transducer coil and said pickup means are positioned proximate to a conveyor for conveying containers to be inspected and are disposed so that successive containers may be magnetically pulsed one at a time by energization of said coil and the vibrations of the resilient wall portion of said successive containers may be sensed by said pickup means, and further including control means for causing said pulsing means to energize said coil repetitively at the rate that said containers are conveyed past said coil and pickup means.

21. Apparatus according to claim 20 wherein said control means includes a switch that is actuated each time a can on said conveyor passes a predetermined point, and further wherein said control means is adapted to cause said pulsing means to energize said coil each time said switch is actuated.

22. Apparatus according to claim 20 including means for selectively rejecting containers on said conveyor according to the resonant frequency of the flexible wall portion of said containers.

23. Apparatus according to claim 20 including indicator means responsively connected to said frequency discriminating means for selectively indicating which containers have fluid pressures conforming to said predetermined standard.

24. A method for monitoring the pressure within a sealed container having at least a resilient wall portion, comprising:
flexing said wall portion by subjecting it to an electromagnetic pulse of force so that said wall portion is caused to vibrate at a frequency that is a function of the fluid pressure in said container;
producing alternating electrical signals in response to and as a function of the vibrations of said wall portion;
gating said signals so as to reject any signals generated while said wall portion is subjected to said pulse of force; and
discriminating said gated signals according to their frequencies.

25. The method of claim 24 further including gating said signals so as to reject noise signals occurring as the amplitude of the vibrations of said wall portion decreases toward zero.

26. The method of claim 24 further including generating an output signal according to the energy content of said electrical signals within a predetermined frequency range.

27. The method of claim 26 further including selectively providing an indication of the pressure in said container according to said output signal.

28. The method of claim 26 further including selectively indicating whether the pressure in said container meets a predetermined standard according to said output signal.

29. The method of claim 26 applied to a series of containers in sequence, and further including selectively rejecting said containers according to said output signal.

30. Method according to claim 24 further including the step of determining the pressure in said container according to the amplitude of said electrical signals at a selected frequency band or within a selected band of frequencies.

31. A method for monitoring the fluid pressure within a sealed container having a resilient wall portion, comprising:
   impulsively deflecting said wall portion with a pulse of electromagnetic energy so that said wall portion is caused to vibrate freely at a frequency that is a function of said fluid pressure;
   producing oscillating electrical signals in response to and as a function of the impulse deflection and the free vibrations of said wall portion; and
   discriminating according to their frequencies only those of said signals which are produced responsively to the free vibrations of said wall portion.

32. A method for monitoring the pressure within a sealed container having at least a resilient wall portion, comprising:
   flexing said wall portion by subjecting it to an electromagnetic pulse of force so that said wall portion is caused to vibrate at a frequency that is a function of the fluid pressure in said container;
   producing alternating electrical signals in response to and as a function of the vibrations of said wall portion;
   gating said signals so as to reject any signals generated while said wall portion is subjected to said pulse of force; and
   determining the pressure in said container according to the intensities of said signals within a predetermined range of frequencies.

* * * * *

PO-1050
(5/69)

UNITED STATES PATENT OFFICE
CERTIFICATE OF CORRECTION

Patent No. 3,802,252      Dated April 9, 1974

Inventor(s) Gary G. Hayward et al

It is certified that error appears in the above-identified patent and that said Letters Patent are hereby corrected as shown below:

In claim 1, Column 16, Line 1, change "subject" to "subjected";

In claim 10, Column 16, Line 68, change "providing" to "producing"; and

In claim 31, Column 19, Line 11, change "impulse" to "impulsive".

Signed and sealed this 1st day of April 1975.

(SEAL)
Attest:

RUTH C. MASON
Attesting Officer

C. MARSHALL DANN
Commissioner of Patents
and Trademarks